US007406212B2

(12) United States Patent
Mohamed et al.

(10) Patent No.: US 7,406,212 B2
(45) Date of Patent: Jul. 29, 2008

(54) METHOD AND SYSTEM FOR PARALLEL PROCESSING OF HOUGH TRANSFORM COMPUTATIONS

(75) Inventors: Magdi A. Mohamed, Schaumburg, IL (US); Irfan Nasir, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 492 days.

(21) Appl. No.: 11/143,169

(22) Filed: Jun. 2, 2005

(65) Prior Publication Data
US 2006/0274973 A1 Dec. 7, 2006

(51) Int. Cl.
G06K 9/36 (2006.01)
G06F 17/14 (2006.01)
(52) U.S. Cl. ................. 382/281; 382/248; 708/400
(58) Field of Classification Search ......... 382/280, 382/281, 248–250; 708/400–410
See application file for complete search history.

(56) References Cited

U.S. PATENT DOCUMENTS 4,618,989 A * 10/1986 Tsukune et al. ............ 382/203
5,220,621 A * 6/1993 Saitoh ..................... 382/200
5,832,138 A * 11/1998 Nakanishi et al. .......... 382/281

2002/0126901 A1* 9/2002 Held ....................... 382/199

OTHER PUBLICATIONS

Clarke, A.; Steineke, C.; Emanuel, H.; "High Image Rate Eye Movement Measurement: A Novel Approach Using CMOS Sensors and Dedicated FPGA Devices" Freie Univensitat Berlin Published in 2000.
Deng, D.; ElGindy H.; "High-Speed Parameterisable Hough Transform Using Reconfigurable Hardware" School of Computer Science and Engineering, University of New South Wales, Kensington NSW 2002 Australian Computer Society.
Mahmoud, M.; Nakanishi, M.; Ogura, T.; "Hough Transform Implementation on a Reconfigurable Highly Parallel Architecture" IEEE 1997.
Majumdar, A. "Design of an ASIC Straight Line Detection in an Image" Indian Institue of Technology, Kharagpur India; Lucent Technologies, Bangalore, India, Published in 2000.

* cited by examiner

Primary Examiner—Aaron W Carter

(57) ABSTRACT

In a parallel computation of a Hough transform of an array of input data values, the transform space of the Hough transform is partitioned dynamically or statically into a number of sub-spaces. Each sub-space of the transform is stored in a sub-space of memory locations. Data values from the array of input data values are passed to a plurality of processors, each processor associated dynamically or statically with a sub-space of memory locations. Each processor, acting in parallel with the other processors, updates constituent elements of the Hough transform stored in the associated sub-space memory locations dependent upon the input data value.

26 Claims, 8 Drawing Sheets

METHOD AND SYSTEM FOR PARALLEL PROCESSING OF HOUGH TRANSFORM COMPUTATIONS

FIELD

This invention relates generally to the field of array processing. More particularly, this invention relates to a system and method for parallel computation of a Hough transform.

BACKGROUND

A common problem in image processing is to find primitives such as straight lines, circles, ellipses, and other higher order polynomials or any curve in frames of image data. One approach is to use a Hough transform. The Hough transform maps a point in the image array to a curve or surface in the transform domain that indicates the parameters of all primitives passing through the point. If the primitive is a straight line, the Hough transform of the entire input image is mathematically equivalent to a 2-dimensional discrete Radon transform or a Slant Stack transform. However, when computing a 2-dimensional discrete Radon transform or a Slant Stack transform it is usual to calculate the transform value at each point in the transform domain from a set of points in the image array.

Generalization of the Hough technique to other curves is straightforward and the method works for any curve $s(x,p)=0$ where x is a position vector of coordinates in the image array and p is a parameter vector of coefficients. The complexity of the Hough transform is strongly dependent on the number of coordinates and coefficients in a given representation. Further generalizations of the Hough transform to detect curves of no simple analytic representations are also possible.

The greatest advantage of Hough method for curve detection is its ability to overlook noisy points in the input data. Extremely noisy points will not change the accumulator values at parameter points of interest. Another advantage is that Hough method can be used to detect multiple curves of similar forms by searching for local maxima in the parameter space.

Calculation of the Hough transform is computationally expensive. This presents problem for real-time applications where rapid computation is required at a low cost. An example is the analysis of video frames from an automobile video camera, for applications such as vehicle guidance and license-plate reading. Another example is machine vision for robot applications. All of these applications require real-time processing of high data rate video frames.

Prior applications in this area have focused mainly on the design of algorithms for implementation on general-purpose processors, such as personal computers, digital signal processors or general-purpose image processors.

The Hough transform requires mapping a point in the image array to a curve or a surface in the transform array. There are two approaches to the computation of the Hough transform. The first approach is to use a large number of accumulators, one for each element in the transform array. This approach results in complex hardware, such as computer graphics cards. The second approach is to use a single accumulator and to store the transform array in a memory. This approach is slow because of the requirement to perform multiple read and write operations for each image pixel to move partial sums between the memory and the accumulator.

Parallel processing hardware has been proposed for computing a Hough transform. In one approach, an image comprising an array of pixel values is partitioned into multiple sub images. The transform of each sub image is computed by a separate processing engine, thereby allowing parallel computation. An example of this approach is described in U.S. Pat. No. 5,809,322 issued on Sep. 15, 1988, and titled "Apparatus and method for signal processing", by Akerib; Avidan (Associate Computing Limited). It describes an application where the image data is partitioned among processors for image analysis routines including Hough transform. A disadvantage of this approach is that in some applications, only pixels corresponding to foreground elements in an image need to be processed. In these applications the number of computations varies linearly with the number of foreground pixels in the input data (the image). Depending upon the spatial distribution of foreground pixels, the workload may not be uniformly distributed among the processors. For example, some sub-images may have no foreground elements while other sub-images may contain only foreground pixels. This results in poor processor utilization. Further, the partial sums of the Hough transform are stored in memory. Since more than one processor may be updating the same physical memory then a shared memory mechanism (such as semaphores) must be used or a separate memory must be used for each processor. The former approach introduces more computational overhead, while the latter approach is more expensive and is not practical for high dimensional Hough transform spaces. Thus, partitioning the image into sub-images is only practical for low-resolution images or for detecting curves with a low number of parameters (such as straight lines).

BRIEF DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment when read in conjunction with the accompanying drawing(s), wherein:

DETAILED DESCRIPTION

Figure 1:
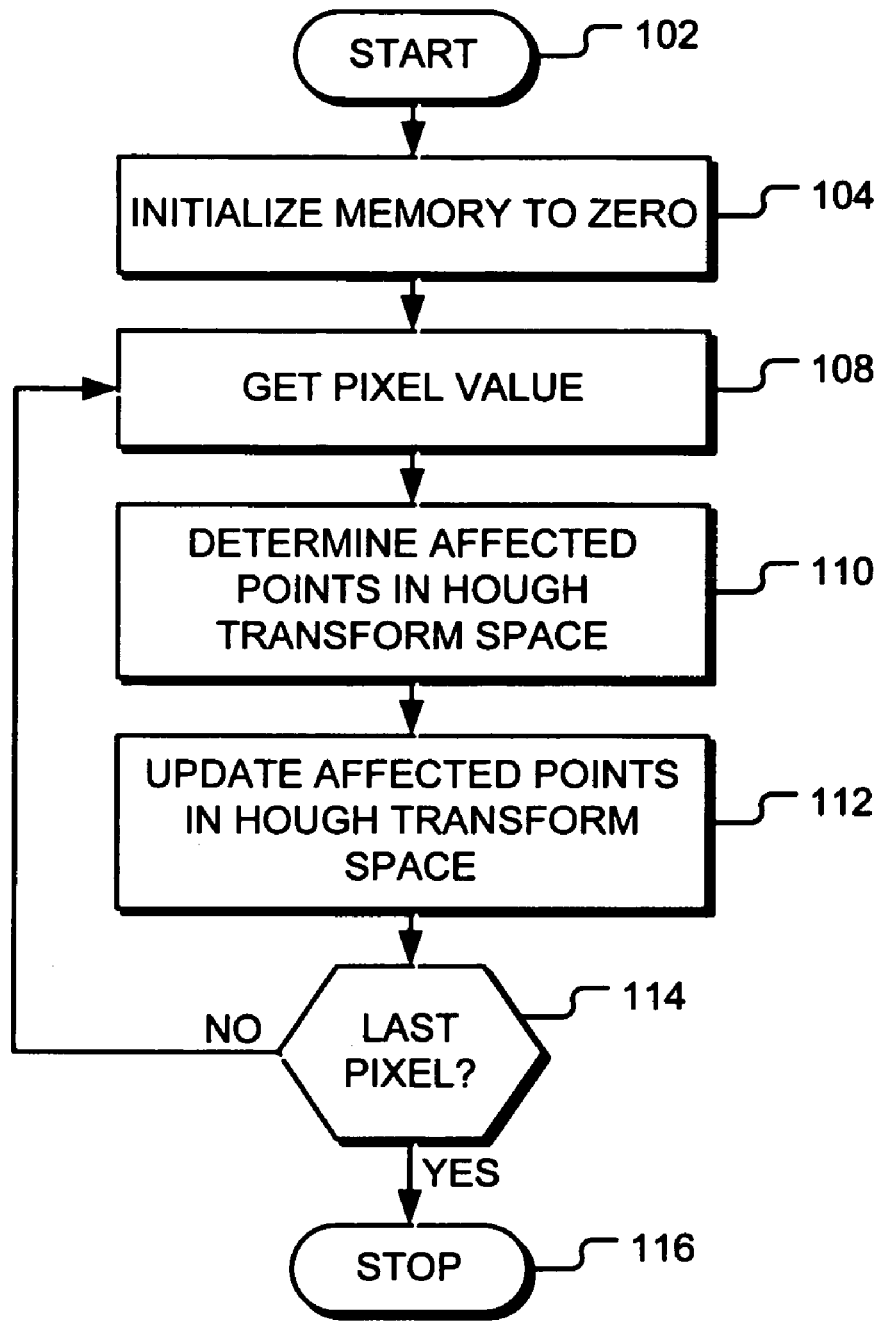
FIG. 1 is a flow chart of a method for computing a Hough transform.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a method and processing architecture for parallel computation of a Hough transform of an array of input data. In one embodiment, the transform space of the Hough transform is dynamically or statically partitioned into a plurality of sub-spaces. Each sub-space of the transform is stored at its constituent sub-space memory addresses. Data values from the array of input data values are passed to a plurality of processors, each processor associated dynamically or statically with a sub-space of memory addresses. Each processor, acting in parallel with the other processors, updates elements of the Hough transform stored at the associated sub-space memory addresses dependent upon the input data value.

Since each processor accesses a separate memory location, so there is no need for a memory sharing mechanism or memory duplication, since each pixel is available to each processor and the processors are updating non-overlapping memory spaces concurrently. Further, the processing is evenly distributed amongst the processors even if only a portion of an image (such as a foreground object) is transformed.

Conceptually, even in the case where the number of processors exceeds the number of foreground pixels, a linear increase in processing speed can be achieved for detecting all kind of curves. This characteristic makes the method and architecture suitable for detecting curves with a high number of parameters (high dimensional Hough spaces). Efficient processor utilization, in updating a single Hough space, is accomplished by partitioning the workload uniformly among all available processors.

The invention has applications in image feature recognition for use in smart image sensors, video analysis devices (such as eye tracking systems), disability interface units, robot vision units, and various clinical equipments, for example.

The Hough transform uses a primitive curve form satisfying the equation $$s(x,p)=0, \quad (1)$$

where p is a parameter vector and x is a position vector in the input image. This can be viewed as an equation defining points x in the image space for fixed parameter vector p, or as defining points in a parameter space for fixed values of the position vector x (i.e. for a particular pixel location).

In computation of a Hough transform the parameter space is quantized to discrete values of the parameter vector to form a Hough parameter space P. For a fixed parameter vector $p_k \in P$, the coordinates of x in the image space that satisfy equation (1) are denoted as $x_n(p_k)$. The value of the corresponding point in the parameter space is defined as $$H(p_k) = \sum_{n=1}^{N} A(x_n(p_k)), \quad (2)$$

where A(x) is the gray level value of the pixel at position x, and N is the total number of pixels in the input image data. Usually A(x) is set to the value 1 for foreground pixels and 0 for background pixels. The value corresponding to a point in the Hough transform space can then be calculated recursively as $$H_0(p_k)=0$$

$$H_n(p_k)=H_{n-1}(p_k)+A(x_n(p_k)), n=1:N. \quad (3)$$

FIG. 1 is a flow chart of a method for computing a Hough transform. Referring to FIG. 1, the computation begins at start block 102. A memory location is used for each point in the Hough transform space. At block 104 the memory is initialized to zero, this corresponds to the step $H_o(p_k)=0$ in equation (3). At block 108, the value $A(x_n)$ of a pixel at position $x_n$ in the image space is retrieved. At block 110, the values of p in the Hough transform space that satisfy the equation $s(x_n,p)=0$ are determined. These values are denoted as $p_k(x_n)$. At block 112, the points $p_k(x_n)$ in the Hough transform space are updated according to $$H_n(p_k(x_n))=H_{n-1}(p_k(x_n))+A(x_n). \quad (4)$$

At decision block 114 a check is made to determine if all of the pixels of the image have been processed. If not, as depicted by the negative branch from decision block 114, flow returns to block 108 and the next pixel value is retrieved. If all of the pixels of the image have been processed, as depicted by the positive branch from decision block 114, computation of the transform is complete and the process ends at block 116.

Figure 2:
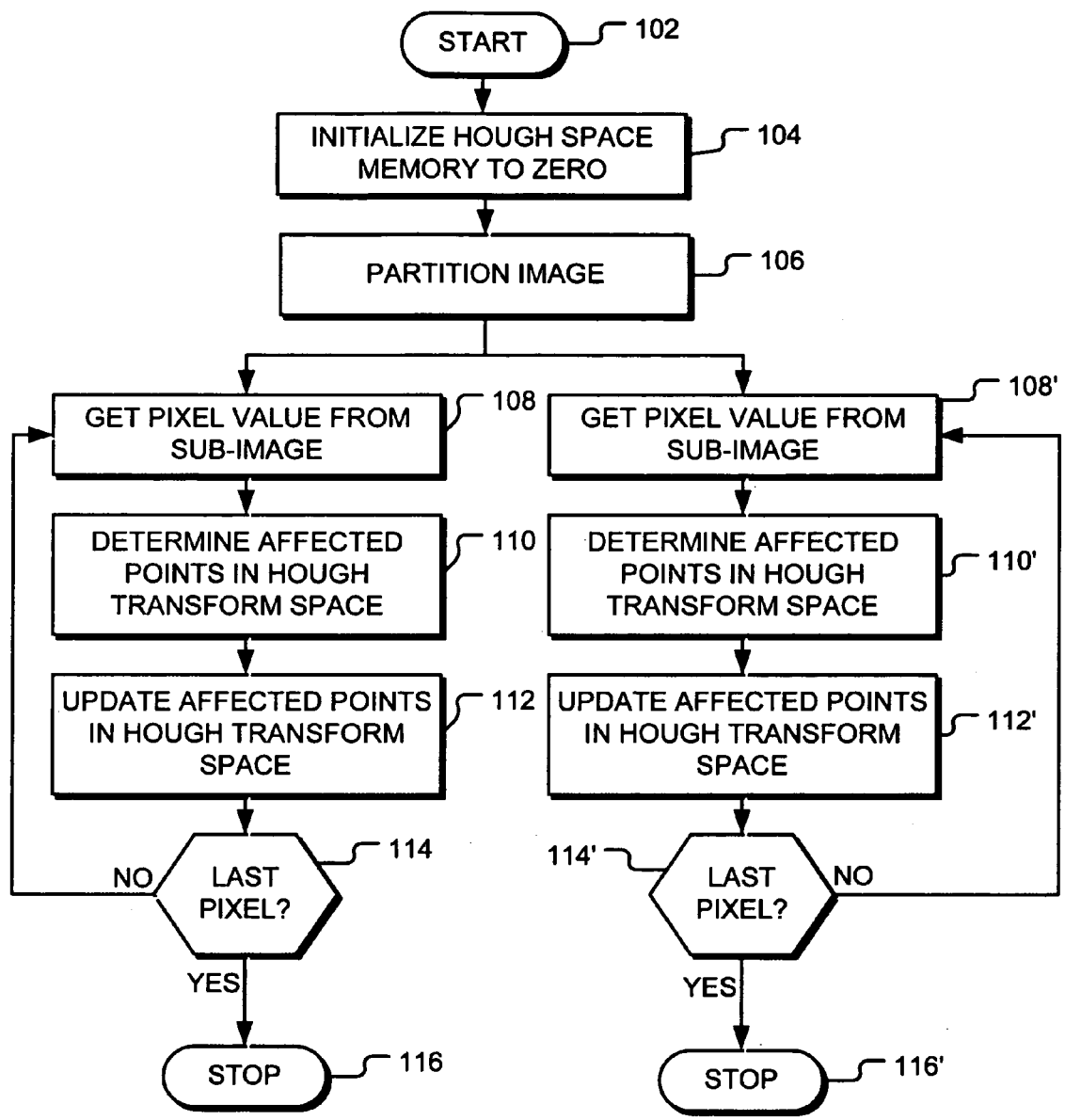
FIG. 2 is a flow chart of a further method for computing a Hough transform.

FIG. 2 is a flow chart of a further method for computing a Hough transform. The method is similar to that described with reference to FIG. 1, except that at block 106 the image is partitioned into a number of sub-images. For simplicity in the flow chart, the method is illustrated for only two sub-images, but a higher number of sub-images may be used. At block 108 a pixel is retrieved from the first sub-image and processed (by a first processor) at blocks 110 and 112. In parallel, at block 108', a pixel is retrieved from the second sub-image and processed (by a second processor) at blocks 110' and 112'. It is noted that the memory initialized at block 104 is shared between the first and second processors. This requires that a mechanism for memory sharing be used.

Figure 3:
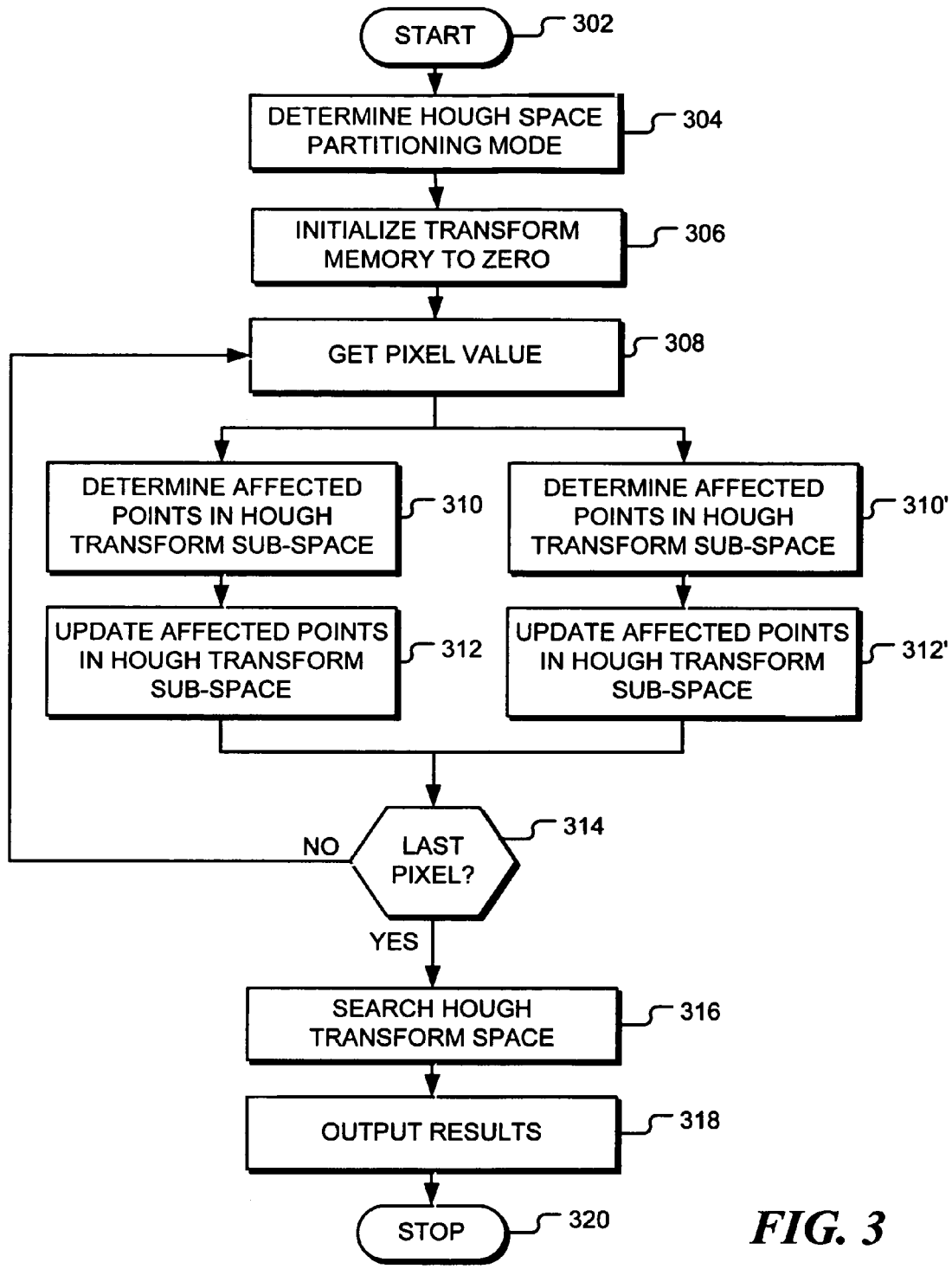
FIG. 3 is a flow chart of a method for computing a Hough transform consistent with certain embodiments of the present invention.

FIG. 3 is a flow chart of a method for computing a Hough transform consistent with certain embodiments of the present invention. Referring to FIG. 3, the computation begins at start block 302. At block 304, the partitioning of the Hough transform space is determined. At this block the quantization of the parameters and the ranges of the parameters are determined. At block 306 the memory is initialized to zero, this corresponds to the step $H_o(p_k)=0$ in equation (3). At block 308, the value $A(x_n)$ of a pixel at position $x_n$ in the image space is retrieved. For simplicity of the flow chart, only two sub-spaces, $P^1$ and $P^2$, are used, but it will be obvious to those skilled in the art that the method may be used with any number of sub-spaces. In general, the transform space is partitioned into M sub-spaces $P^m$, such that $$P = \bigcup_{m=1}^{M} P^m$$

is the union of the M sub-spaces. Each sub-space contains a subset of the parameters p of the complete Hough transform. The sub-space partition may be determined in advance and be static, or the sub-space partition may be determined dynamically. When the sub-space partition is determined dynamically, the memory associated with each processor may be allocated dynamically from a single physical memory. In one embodiment, the subspaces are allocated so as to provide a specified for each point in the Hough transform space. At block 310, the values of p in the first Hough transform sub-space that satisfy the equation $s(x_n,p)=0$ are determined. These values are denoted as $p_k^1(x_n)$. At block 312, the values of the affected elements $p_k^1(x_n)$ in the Hough transform sub-space are updated (by a first processor) according to $$H_n(p_k^1(x_n)) = H_{n-1}(p_k^1(x_n)) + A(x_n). \quad (5)$$

At block 310', the values of p in the second Hough transform sub-space that satisfy the equation $s(x_n, p)=0$ are determined. These values are denoted as $p_k^2(x_n)$. At block 312, the affected points $p_k^2(x_n)$ in the Hough transform sub-space are updated (by a second processor) according to $$H_n(p_k^2(x_n)) = H_{n-1}(p_k^2(x_n)) + A(x_n). \quad (6)$$

Thus, the first and second processors are updating different memory location, so there is no need for a memory sharing mechanism.

At decision block 314 a check is made to determine if all of the pixels of the image have been processed. If not, as depicted by the negative branch from decision block 314, flow returns to block 308 and the next pixel value is retrieved. If all of the pixels of the image have been processed, as depicted by the positive branch from decision block 314, the transform is complete and flow continues to block 316. At block 316, a search of the transform space may be made to identify features of the image. The results of the process are output at block 318 and the process ends at block 320.

Figure 4:
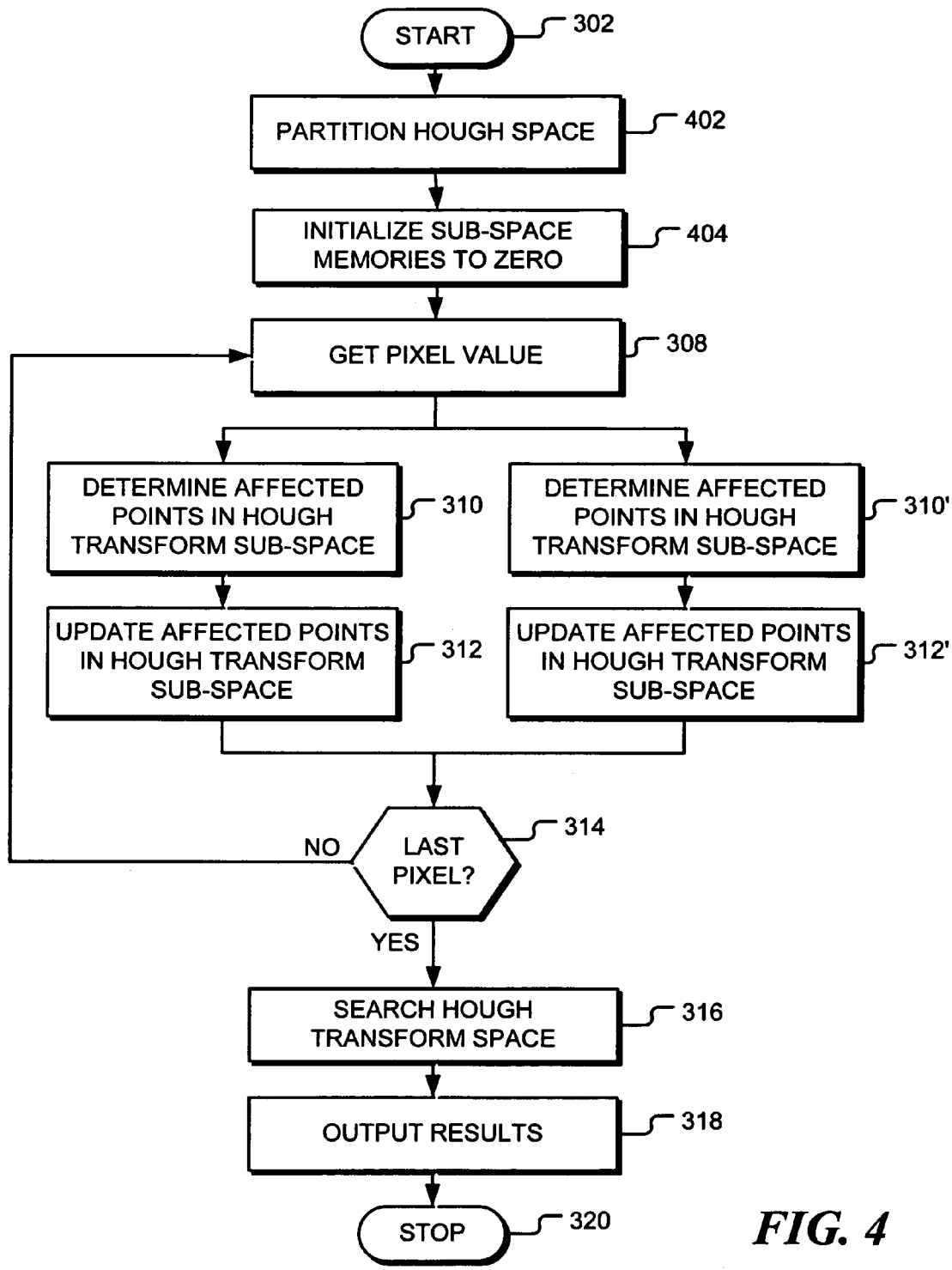
FIG. 4 is a flow chart of a further method for computing a Hough transform consistent with certain embodiments of the present invention.

FIG. 4 is a flow chart of a further method for computing a Hough transform consistent with certain embodiments of the present invention. The method of FIG. 4 is similar to that of FIG. 3, except that the Hough space is partitioned statically at block 402. That is, each processor is allocated a sub-space of the Hough space before processing of an image is begun. Since the sub-space partitioning is static, the memory allocation may also be static so that each processor is associated with a separate sub-space memory partition (or even a separate memory). At block 404, the sub-space memories are initialized to zero.

Figure 5:
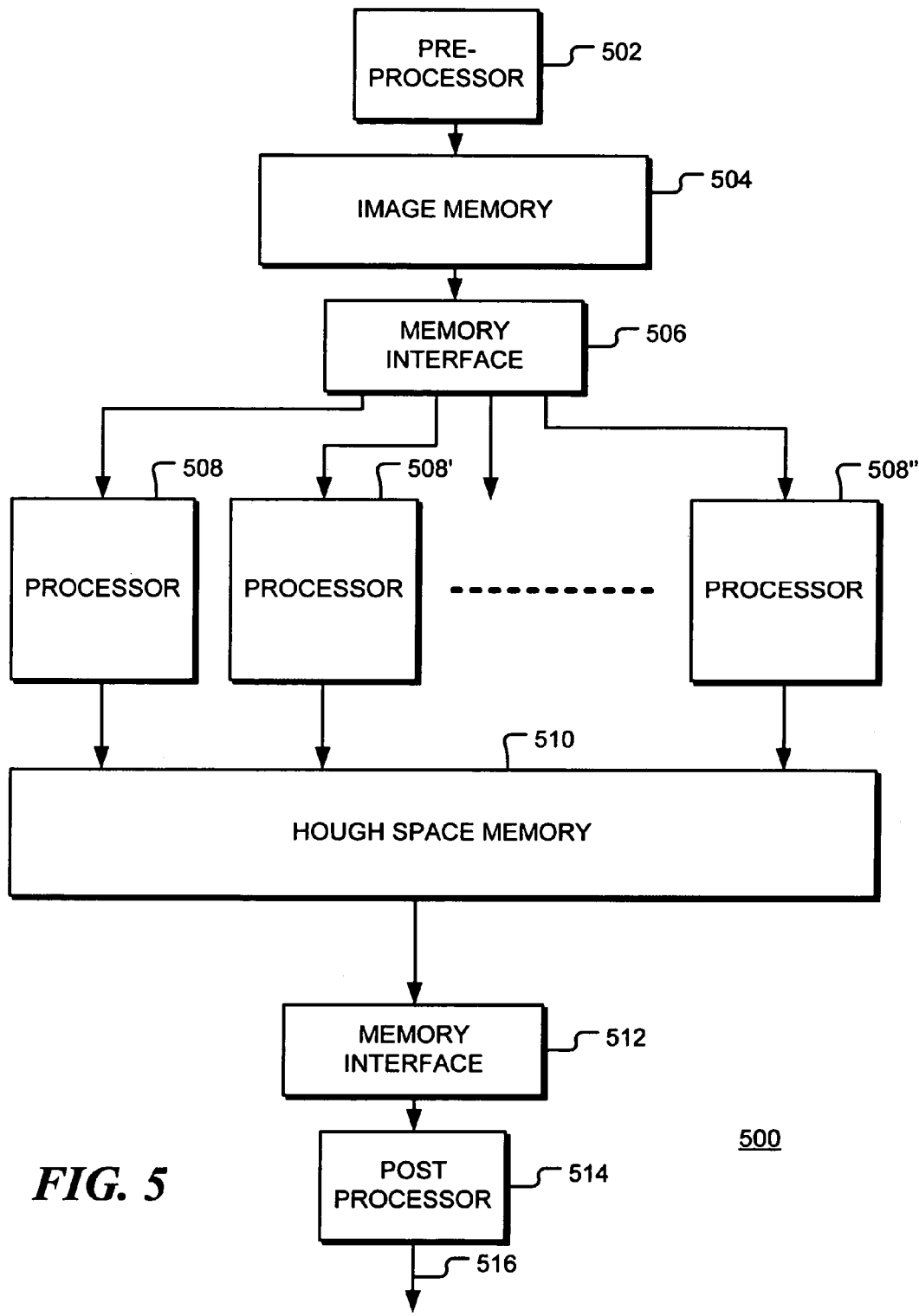
FIG. 5 is a diagram of a parallel processing system consistent with certain embodiments of the invention.

FIG. 5 is a diagram of a parallel processor consistent with certain embodiments of the invention. Referring to FIG. 5, the parallel processor 500 comprises an optional pre-processor 504. The pre-processing may be used, for example, to select areas of the image, such as foreground elements, to be processed, or to detect edges in the image. The array of data values (pixel values) of the pre-processed (or original) image is stored an image memory 504. A memory interface 506 couples the image memory 504 to a plurality of processors, 508, 508', 508'', etc. The memory interface 506 is configured to retrieve a sequence of pixel values from the image memory 504 and distribute the pixels values to the processors. Each pixel value is sent to every processor. Each processor can be used to compute transform values in a sub-space of the complete Hough transform space. Processors 508, 508' and 508'' are coupled to a transform space memory 510 that is used to store transform values for the sub-spaces of the Hough transform space. At a given time during the computation, each processor addresses a non-overlapping address space in the memory 510.

In operation, each pixel value in turn is retrieved from the image memory 504 and passed via memory interface 506 to the processors 508, 508', 508'' etc., and each processor updates Hough transform values in its associated memory locations in transform space memory 510. Once all of the pixel values have been processed, the complete Hough transform may be accessed through a second memory interface 512 by an optional post processor 514. The post processor 514 may be used to search the Hough transform space to identify features of the image. For example, the transform space may be searched to find the largest value in the Hough transform array elements and its location. The results of the search, and/or the Hough transform itself may be provided at output 516.

Figure 6:
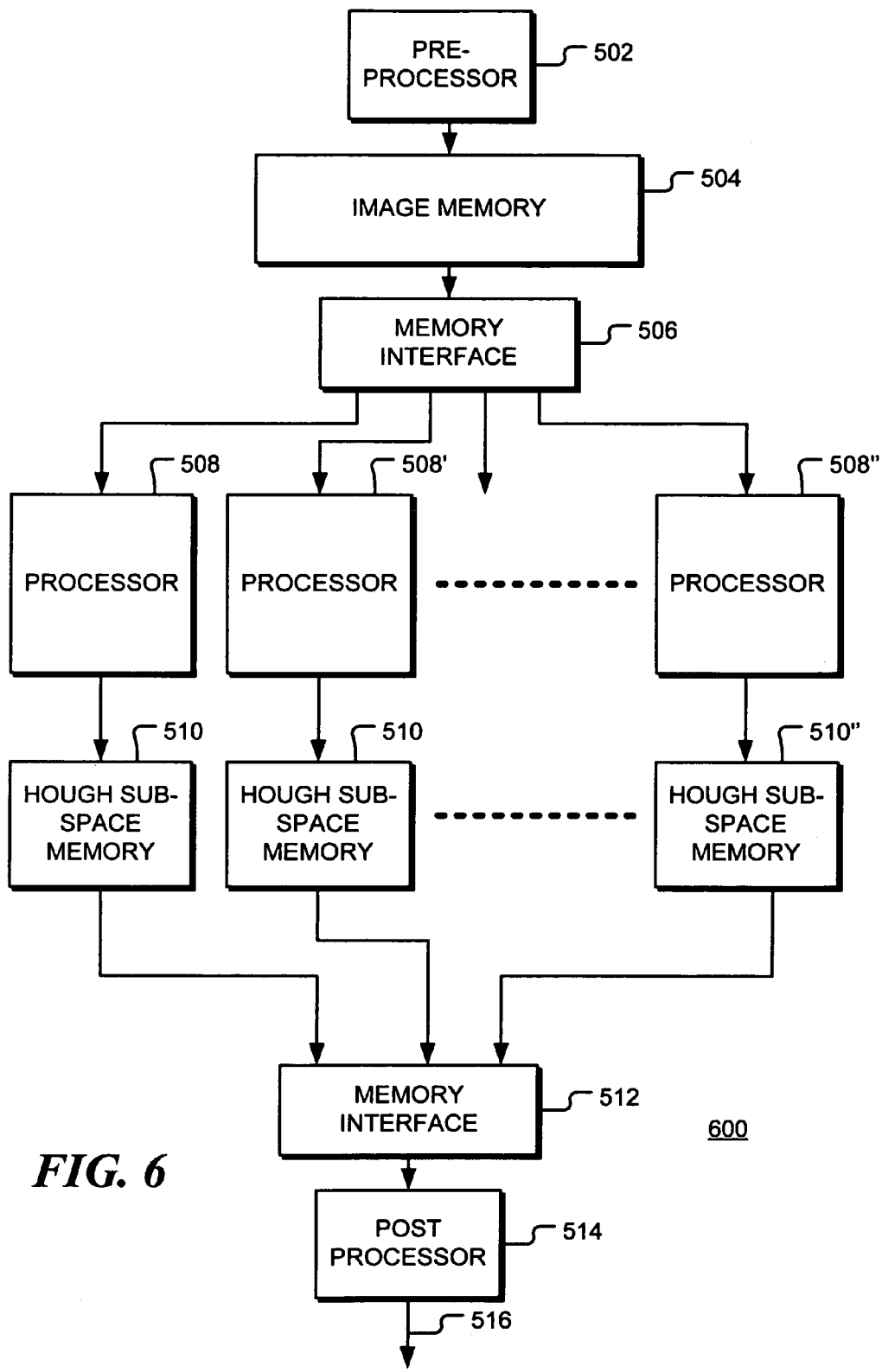
FIG. 6 is a diagram of a further parallel processing system consistent with certain embodiments of the invention.

FIG. 6 is a diagram of a further parallel processor consistent with certain embodiments of the invention. The parallel processor in FIG. 6 is similar to that in FIG. 5, except Referring to FIG. 6, that each of the processors 508, 508', 508'' is coupled to its own sub-space memory, 510, 510' or 510''. These memories may be partitions of the same physical memory or may be separate memories.

Figure 7:
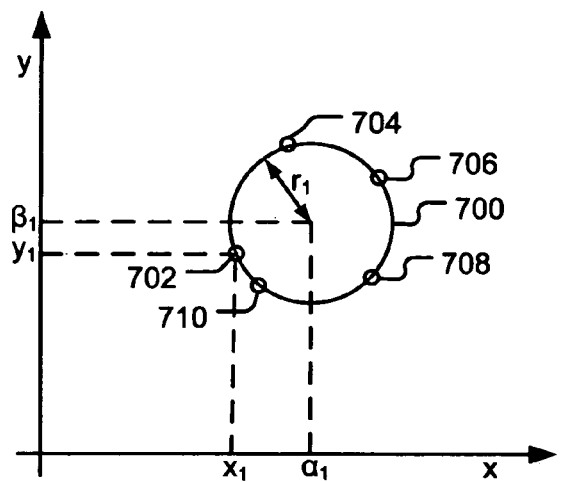
FIG. 7 is a plot of an exemplary curve in an image space.

As an example, we consider a Hough transform for which the primitive curve is a circle of unknown center location and radius values. The equation of the circle is $$s(x,p) = (x-\alpha)^2 + (y-\beta)^2 - r^2 = 0, \quad (7)$$

where $x=(x,y)$ is a position in the image space and $p=(\alpha, \beta, r)$ is a point in the three dimensional Hough transform space. A curve 700 with parameter vector $p_1=(\alpha_1,\beta_1,r_1)$ is shown in FIG. 7. The point $x_1=(x_1,y_1)$ in the image space (502) lies close to the curve and contributes to the point $p_1=(\alpha_1,\beta_1,r_1)$ in the transform space. Similarly, the points 704, 706, 708 and 710 lie close to the circle 700 and also contribute to the point $p_1=(\alpha_1,\beta_1,r_1)$ in the transform space. The point $x_1=(x_1, y_1)$ in the image space (702) also contributes to other points in the transform space, since other circles may be drawn passing through the point 702. These points are shown as circle 802 in FIG. 8. Similarly, points 704, 706, 708 and 710 contribute to circles 804, 806, 808 and 810, respectively, in the transform space as illustrated in FIG. 8.

In this example, the three-dimensional Hough transform space can be partitioned such that transform vectors having the same value of the radius r lie in the same sub-space. Thus, there is one sub-space for each value of r. The two-dimensional sub-space for $r=r_1$ is shown in FIG. 8. The figure shows examples of curves 802, 804, 806, 808 and 810, to which the points 702, 704, 706, 708 and 710 in the image space (FIG. 7) contribute, respectively. The point $p_1=(\alpha_1,\beta_1,r_1)$ lies in this sub-space, so the point $x_1=(x_1,y_1)$ in the image space contributes to the point $(\alpha_1,\beta_1)$ in the transform sub-space. Other circles in the image space with radius $r_1$ pass through the point $(x_1,y_1)$. These circles have different values of $\alpha$ and $\beta$, but are also affected by the point $(x_1,y_1)$ in the image space. The values of $\alpha$ and $\beta$, that are affected in the transform sub-space satisfy the equation $$(x_1-\alpha)^2 + (y_1-\beta)^2 - r_1^2 = 0, \quad (8)$$

Figure 8:
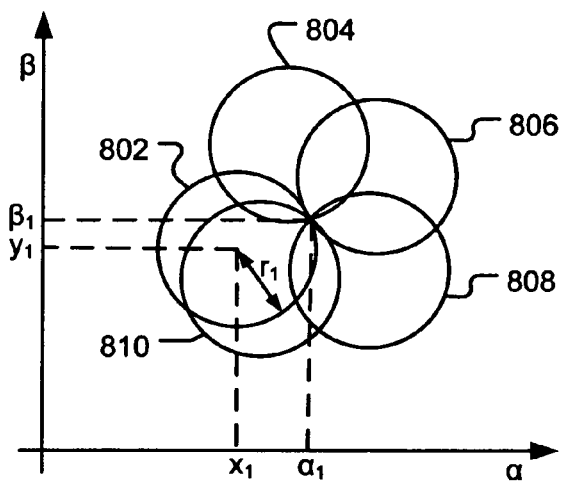
FIG. 8 is a plot of a corresponding curve in a Hough transform sub-space.

This is shown as the circle 802 in FIG. 8. The quantized values of $\alpha$ and $\beta$ determine which memory locations are to be updated.

Circles in the images space with a radius different than $r_1$ also pass through the point $(x_1,y_1)$. These circles contribute to values of $\alpha$ and $\beta$ in different transform sub-spaces (in this example partitioning).

As a further example, ellipses in an image may be detected by using curves parameterized by the equation $$(x-x_e)^2/a^2 + (y-y_e)^2/b^2 = 1, \quad (9)$$

which has four parameters, $(x_e, y_e, a, b)$, and results in a four-dimensional transform space.

The Hough transform space may be partitioned in any fashion. However, in most situations it will be advantageous to partition the transform space such that processing is evenly distributed among the available processors. For example, when the Hough transform primitive is a circle, a single image point contributes to transform points on the surface of a cone in the 3-dimensional Hough transform space. While this Hough space is logically a 3-dimensional space, it will be physically stored in a 1-dimensional memory by mapping the parameter indices in a predefined order as usually done with high dimensional data structures. If two processors were available, the cone could be partitioned dynamically by a plane passing through the axis of the cone. One processor could compute the contributions to one half of the cone, while the other processor could compute the contributions to the other half. In general, when M processors are available, the cone could be partitioned dynamically by predefined planes emanating from the axis of the cone.

On the other hand, static partitioning can also be useful in situations where each processor has its separate memory unit. For example, when the Hough transform primitive is a circle, a single image point contributes to transform points on the surface of a cone in the 3-dimensional Hough transform space. If two processors were available, the cone could be partitioned statically by a plane across the radius axis of the cone. One processor could compute the contributions to one part of the cone (from $r_{min}$ to $r_{cut}$), while the other processor could compute the contributions to the other part (from $r_{cut}+1$ to $r_{max}$), where $r_{cut}$ is chosen (offline) such that the surfaces of the cone parts are approximately equal. Here $r_{min}$ and $r_{max}$ defines the range of interest for the radius parameter values. In general, when M processors are available, the Hough space could be partitioned statically by (M−1) planes across the radius axis of the cone.

Figure 9:
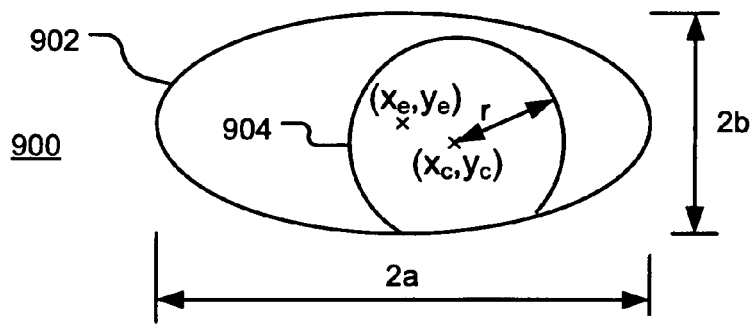
FIG. 9 is a Hough transform model for optical eye tracking.

An exemplary application of parallel Hough transform calculation is optical eye tracking. In optical eye tracking, a human eye is modeled as a full or part circle representing the iris edges inside an ellipse representing the eyelid edges. Referring to FIG. 9, the eye model 900 includes an ellipse 902 centered at $(x_e,y_e)$ and a circle 904 centered at $(x_c,y_c)$. The ellipse satisfies the equation $$(x-x_e)^2/a^2+(y-y_e)^2/b^2=1, \qquad (10)$$

while the circle satisfies the equation $$(x-x_c)^2/r^2+(y-y_c)^2/r^2=1. \qquad (11)$$

The choice of an ellipse for representing the eye opening is made because it allows the use of a single Hough space for detecting both curves (since circles are ellipses with parameters $(x_c,y_c, r, r)$). Since it is impractical to generate perfect feature images, the system relies on the robustness of the Hough method to deal with noisy, incomplete, and occluded edges.

The Hough method is used in this optical eye tracking system to estimate the circle parameters $(x_c,y_c, r)$, and the ellipse parameters $(x_e,y_e, a, b)$ for each captured video frame in real time.

Figure 10:
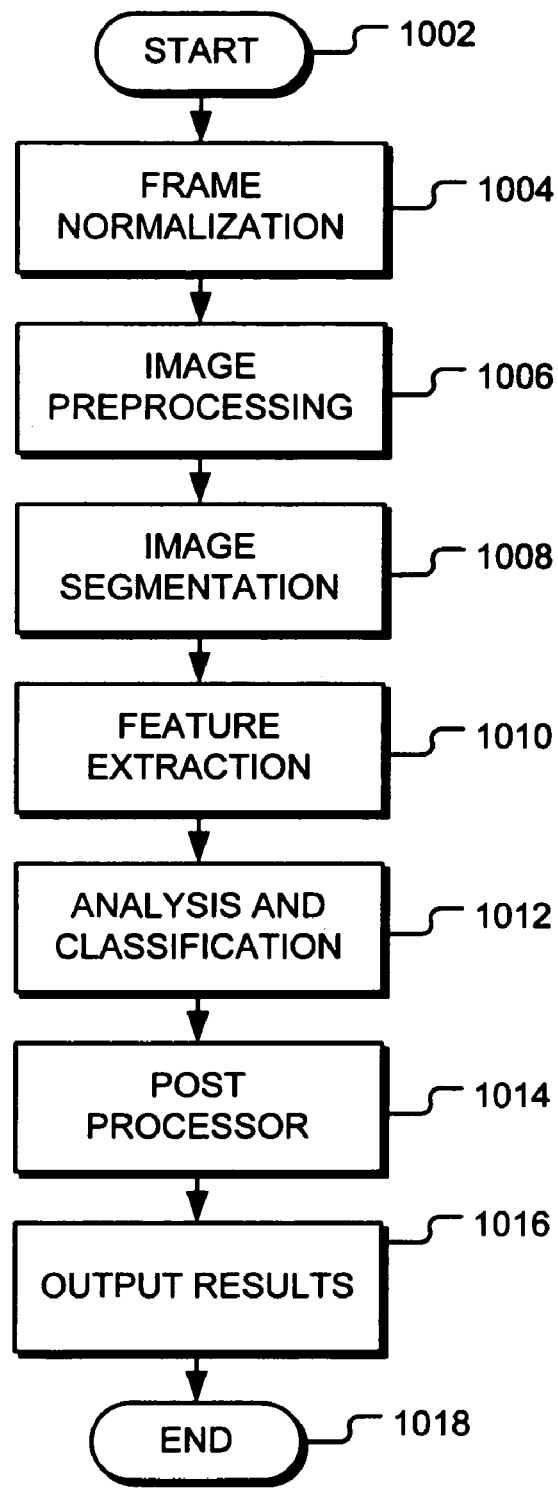
FIG. 10 is a flow chart of a method of eye tracking system consistent with certain embodiments of the invention.

FIG. 10 is a flow chart 1000 showing operation of an eye tracking system consistent with certain embodiments of the invention. The flow chart depicts the processing of a single video frame of an array of input image pixels $(x_1,x_2,\ldots,x_n)$ to generate a number of facial action units $(a_1,a_2,\ldots,a_c)$. Referring to FIG. 10, following start block 802, the frame is normalized at block 1004. Normalization is used because variations in size, light, color, orientation angles, and different styles challenge the robustness of computer vision algorithms. The purpose of the normalization operation is to remove the variations among images rather than to enhance an image. A captured image may need to be downscaled because of the use of a fixed feature template size, or for speedup considerations. Light and color normalization can be performed using histogram-mapping operators (histogram equalization, normalization, or any other manipulation). Pose normalization can be used to adjust the subject orientation angle. In one embodiment, the captured frame is scaled down to a fixed size color image, and then histogram equalization is performed on the resized image. Orientation normalization may be used to ensure that the ellipses are in a horizontal direction.

The image is preprocessed at block 1006. The preprocessing improves the normalized image and prepares it for subsequent image understanding operations. The preprocessing may include conversion of an input image into a binary image (i.e. an image having two gray levels). Linear and/or nonlinear image filtering may be applied to reduce noise effects and normalization artifacts. Smoothing may be applied to refine the image component boundaries inside each captured frame. For example, a median-filter (using a 3×3 square kernel (window) for example) may be applied to the normalized color image.

The image is segmented at block 1008. The segmentation process is used to identify potential eye regions of interest for curve fitting. Segmentation is the process of breaking an image into its constituent components. For example, mathematical morphology techniques may be used for generating segmentation hypothesis to be verified at later processing stages. Also, clustering techniques can be used to provide capabilities for detecting natural grouping of objects. Still further, relaxation techniques may be used to allow for compatibility considerations among neighboring objects to iteratively refine confidence measures. The detected components may be labeled for subsequent processing.

At block 1010 low level features of the segmented image, such as edges, are detected using templates of their image regions, contours, or both. In one embodiment, edge detection is performed to emphasize feature boundaries/contours. Since applying a threshold operator on an edge image may result in thick contours, a thinning process can be used to produce 1-pixel thick contours. Usually the detected contours are discontinued, but can be linked if desired. In one embodiment, the edges of the filtered image are detected using a Sobel gradient magnitude operator. After comparing the gradient feature image to a threshold, the three bands (Red, Green, Blue) are combined into a one-band binary feature image by applying a pixel-wise "AND" operator. A thinning process is then applied to the binary feature image to produce a 1-pixel thick feature image.

Image analysis and classification are performed at block 1012. Search techniques are used to find optimal or suboptimal estimations to detect one or more high level features of interest. A high level feature is usually a particular object, such as an eye, a person or a vehicle license plate. This is in contrast to a low level feature, such as an edge or a corner, which may be a feature common to multiple objects. Image understanding techniques are used to compute parameters required for constructing facial action unit representation. The eye tracking system searches for the best circle and ellipse inside the binary feature image to estimate the position of an iris and eyelid. The search is performed using the Hough transform method for detecting circles and ellipses described above, using a single Hough transform of ellipse primitives.

Post-Processing is performed at block 1014. Post-processing is used for checking consistency of spatial relationships between features within the same frame, and for checks among subsequent frames and for construction of the action units $(a_1,a_2,\ldots,a_c)$. In one embodiment, a set of heuristic rules are applied to watch for improbable situations. For eye tracking, the number of edge points used for fitting the curve of interest is check to determine if it is greater than a fixed value. This process may also be used for detecting blinks. The estimated circle and ellipse parameters provide the information required to compute the action units of eye motion. The animation parameters can be expressed according to MPEG-4 standard as Facial Animation Parameters (FAPS), or other conventional Facial Action Codes (FACS), for example.

At block 1016, the action units $(a_1, a_2, \ldots, a_c)$ and other results are output. The process terminates at block 1018.

For most computer vision applications, computation of the Hough transform consumes more than half of the total image processing time, depending on the resolution of input data and the require accuracy of estimation. Usually, parallel processing hardware is used for Hough transform computation. However, it will be apparent to those of ordinary skill in the art that other image processing algorithms, such as parallel thinning algorithms and morphological operations, can benefit from parallel computation as described above. An image processing algorithm generally transforms an input image array to an output transform array (an output memory space). The present invention provides a general technique that dynamically, or statically, partitions the output array (the output memory space) into a number of subspaces and assigns a parallel processing element to each subspace. This approach avoids memory conflicts and provides an even distribution of available computation and memory resources.

It is also worth noting that while the present invention has been described with two exemplary embodiments, one using dynamic partitioning and the second using static partitioning of the output array, alternative hybrid solutions can be used where both dynamic and static partitioning are utilized simultaneously. The nature of the application of interest and available resources may suggest static, dynamic or a hybrid partitioning scheme.

Those of ordinary skill in the art will recognize that the present invention has been described in terms of exemplary embodiments. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, field programmable gate arrays, ASICS and/or dedicated hard-wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A system for parallel computation of a Hough transform that utilizes a curve parameterized by the equation $s(x,p)=0$, where p is a parameter vector in the transform space, x is a position vector in the data array, and s is a function, the system comprising:
   a plurality of processors capable of parallel operation;
   a first memory interface for retrieving a data value at position $x_i$ from an image memory and passing the data value to each of the plurality of processors; and
   a plurality of Hough transform sub-space memories, each associated with a processor of the plurality of processors;
   wherein a processor of the plurality of processors is operable to receive the data value at position $x_i$ from the first memory interface and update Hough transform values of parameters p satisfying the equation $s(x_i,p)=0$ in the associated memory of the plurality of Hough transform sub-space memories.

2. A system in accordance with claim 1, further comprising an image memory operable to store a plurality of data values.

3. A system in accordance with claim 2, further comprising a pre-processor, operable to pre-process a plurality of pixel values of an image to produce the plurality of data values in the image memory.

4. A system in accordance with claim 1, further comprising:
   a second memory interface operable to retrieve Hough transform values from the plurality of Hough transform sub-space memories; and
   a post-processor, operable to process the Hough transform values.

5. A system in accordance with claim 1, wherein the plurality of Hough transform sub-space memories comprise non-overlapping regions of a single physical memory.

6. A system in accordance with claim 5, wherein the plurality of Hough transform sub-space memories are dynamically allocated from the single physical memory.

7. A method for parallel computation of a transform of an array of data values to a transform space, the method comprising:
   initializing a transform space memory;
   retrieving a data value from the array of data values;
   partitioning the transform space memory into a plurality of transform sub-space memories;
   passing the data value to a plurality of processors, each processor associated with a transform sub-space memory of the plurality of transform sub-space memories;
   each processor of the plurality of processors updating a plurality of elements of the transform stored in the associated transform sub-space memory dependent upon the data value; and
   providing an output dependent upon elements of the transform space, wherein the transform comprises a Hough transform that utilizes a curve parameterized by the equation $s(x,p)=0$, where p is a parameter vector in the transform space, x is a position vector in the data array, and s is a function and wherein the data value at position $x_i$ is used to update transform parameters p satisfying the equation $s(x_i,p)=0$.

8. A method in accordance with claim 7, wherein updating elements of the transform comprises:
   determining a set of elements in the transform sub-space that are affected by the data value; and
   adding the data value to each element in the set of affected elements.

9. A method in accordance with claim 7, wherein the data array comprises pixel values determined by preprocessing an image to detect foreground elements.

10. A method in accordance with claim 7, wherein the data array comprises pixel values determined by preprocessing an image to detect edges of objects in the image.

11. A method in accordance with claim 7, further comprising searching the elements of the Hough transform to find the largest value in the Hough transform elements and wherein providing an output dependent upon the elements of the Hough transform comprises outputting the largest value and its location in the Hough transform.

12. A method in accordance with claim 7, wherein the parallel computation is of a Hough transform and further comprising:

prior to initializing, quantizing the transform space of the Hough transform into a plurality of discrete parameter values, each parameter value have K elements and the plurality of discrete parameter values defining a K-dimensional discrete transform space.

13. A method in accordance with claim 12, wherein the transform memory is partitioned into a plurality of Hough transform sub-space memories such that computation of the Hough transform is distributed among the processor of the plurality of processors in accordance with a specified distribution.

14. A method in accordance with claim 12, wherein the transform memory is partitioned into a plurality of Hough transform sub-space memories such that computation of the Hough transform is approximately evenly distributed among the processor of the plurality of processors.

15. A method for identifying a high level feature of an image represented as an input array of pixel values, comprising:

normalizing the input array of pixel values;
pre-processing the array of normalized pixel values to provide an array of data values;
segmenting the array of data values into one or more regions of interest;
identifying low level features in the array of data values;
dynamically partitioning the transform space of a Hough transform into a plurality of sub-spaces, each sub-space configured to store a plurality of elements of the Hough transform, such that computation of the Hough transform is distributed among a processor of a plurality of processors in accordance with a specified distribution;
calculating, in parallel using one processor for each sub-space, the Hough transform of the one or more regions of interest in the plurality of sub-spaces;
searching the Hough transform space to identify the high level feature of the image; and
outputting parameters to specify the high level feature of the image.

16. A method in accordance with claim 15, wherein identifying low level features in the array of data values comprises detecting edges of objects in the image.

17. A method in accordance with claim 15, wherein the high level feature is an eye position defined by the location of an iris with respect to an eyelid.

18. A method for identifying a high level feature of an image represented as an input array of pixel values, comprising:

normalizing the input array of pixel values;
pre-processing the array of normalized pixel values to provide an array of data values;
segmenting the array of data values into one or more regions of interest;
identifying low level features in the array of data values;
partitioning the transform space of a Hough transform into a plurality of sub-spaces, each sub-space configured to store a plurality of elements of the Hough transform
calculating, in parallel using one processor for each sub-space, the Hough transform of the one or more regions of interest in the plurality of sub-spaces;
searching the Hough transform space to identify the high level feature of the image; and
outputting parameters to specify the high level feature of the image, wherein the array of pixel values define a video frame, the method further comprising:
post-processing the identified high level feature to check for consistency between adjacent video frames.

19. A system for computing a Hough transform comprising:

a plurality of processing means, capable of parallel operation, each operable to calculate a sub-set of elements of a Hough transform;
a plurality of sub-space storage means, each associated with a processing means of the plurality of processing means and operable to store a subset of elements of the Hough transform;
a means for distributing a pixel location value to each processing means of the plurality of processing means; and
a means for outputting a result dependent upon the elements of the Hough transform,
wherein the Hough transform utilizes a curve parameterized by the equation $s(x,p)=0$, where p is a parameter vector in the transform space, x is a position vector in the data array, and s is a function and wherein the data value at position $x_i$ is used to update transform parameters p satisfying the equation $s(x_i, p)=0$.

20. A system in accordance with claim 19, further comprising a post-processing means for searching the elements of the Hough transform to detect the largest transform elements.

21. A system in accordance with claim 19, wherein the plurality of sub-space storage means comprises non-overlapping regions of a memory.

22. A system in accordance with claim 21, wherein the non-overlapping regions of a memory are allocated dynamically.

23. A Hough transform method for tracking eye movements, comprising:

receiving a video frame comprising an array of first data values;
preprocessing the array of first data values to provide a plurality of second data values;
calculating a Hough transform of the plurality of second data values for elliptical primitive curves;
identifying eye positions by detecting ellipses using the Hough transform; and
identifying iris positions by detecting circles using the Hough transform of elliptical primitive curves;
wherein calculating a Hough transform of the plurality of second data values comprises:
initializing a Hough transform memory;
retrieving a data value from the plurality of second data values;
passing the data value to a plurality of processors;
associating each processor of the plurality of processors with a Hough transform sub-space memory of the Hough transform memory; and
each processor of the plurality of processors updating elements of the Hough transform stored in the associated Hough transform sub-space memory dependent upon the data value.

24. A method in accordance with claim 23, wherein associating each processor of the plurality of processors with a Hough transform sub-space memory of the Hough transform memory comprises dynamically allocating a Hough transform sub-space memory to each processor to maintain a substantially equal distribution of computation between the plurality of processors.

25. A method in accordance with claim 23, wherein preprocessing the array of first data values to provide a plurality of second data values comprises:
  normalizing the array of first data values to provide an array of normalized data values;
  filtering the array of normalized data values to provide an array of filtered data values;
  segmenting the array of filtered data values to obtain one or more regions of interest; and
  extracting low level features in the one or more regions of interest.

26. A method in accordance with claim 23, wherein identifying eye positions and identifying iris positions further comprises checking for consistency with adjacent video frames.

* * * * *